(12) United States Patent
Berz

(10) Patent No.: US 8,913,355 B2
(45) Date of Patent: Dec. 16, 2014

(54) TOTALLY INSULATED SWITCHED MODE POWER SUPPLY

(75) Inventor: Arno Berz, Rheinstetten (DE)

(73) Assignee: Siemens Aktiengesellschaft, Munich (DE)

( * ) Notice: Subject to any disclaimer, the term of this patent is extended or adjusted under 35 U.S.C. 154(b) by 210 days.

(21) Appl. No.: 13/568,255

(22) Filed: Aug. 7, 2012

(65) Prior Publication Data

US 2013/0201582 A1   Aug. 8, 2013

(30) Foreign Application Priority Data

Aug. 8, 2011   (EP) ..................................... 11176859

(51) Int. Cl.
*H02H 3/00* (2006.01)
*H02H 3/02* (2006.01)
*H02M 1/44* (2007.01)

(52) U.S. Cl.
CPC .. *H02H 3/02* (2013.01); *H02M 1/44* (2013.01)
USPC .......................................................... 361/42

(58) Field of Classification Search
USPC .......................................................... 361/42
See application file for complete search history.

(56) References Cited

U.S. PATENT DOCUMENTS

| | | | |
|---|---|---|---|
| 6,603,317 B2 * | 8/2003 | Tokita ........................... | 324/628 |
| 2011/0007444 A1 | 1/2011 | Chang | |
| 2011/0128087 A1 | 6/2011 | Chikando | |

FOREIGN PATENT DOCUMENTS

| | | |
|---|---|---|
| CN | 2154491 | 1/1994 |
| CN | 1851484 | 10/2006 |
| JP | 10294633 A | 11/1998 |
| KR | 20110061869 A | 6/2011 |
| WO | WO 2005/064760 | 7/2005 |

* cited by examiner

*Primary Examiner* — Stephen W Jackson
(74) *Attorney, Agent, or Firm* — Cozen O'Connor

(57) ABSTRACT

A totally insulated switched mode power supply for producing a supply voltage for an electrical device, wherein the switched mode power supply includes a first and a second electrical conductor, of which one electrical conductor is for connection to a phase conductor and the other electrical conductor is for connection to a neutral conductor of a grounded AC or three-phase power supply system, and includes Y capacitors for asymmetrical interference suppression of the switched mode power supply such that measures are provided for reducing fault currents or leakage currents.

3 Claims, 1 Drawing Sheet

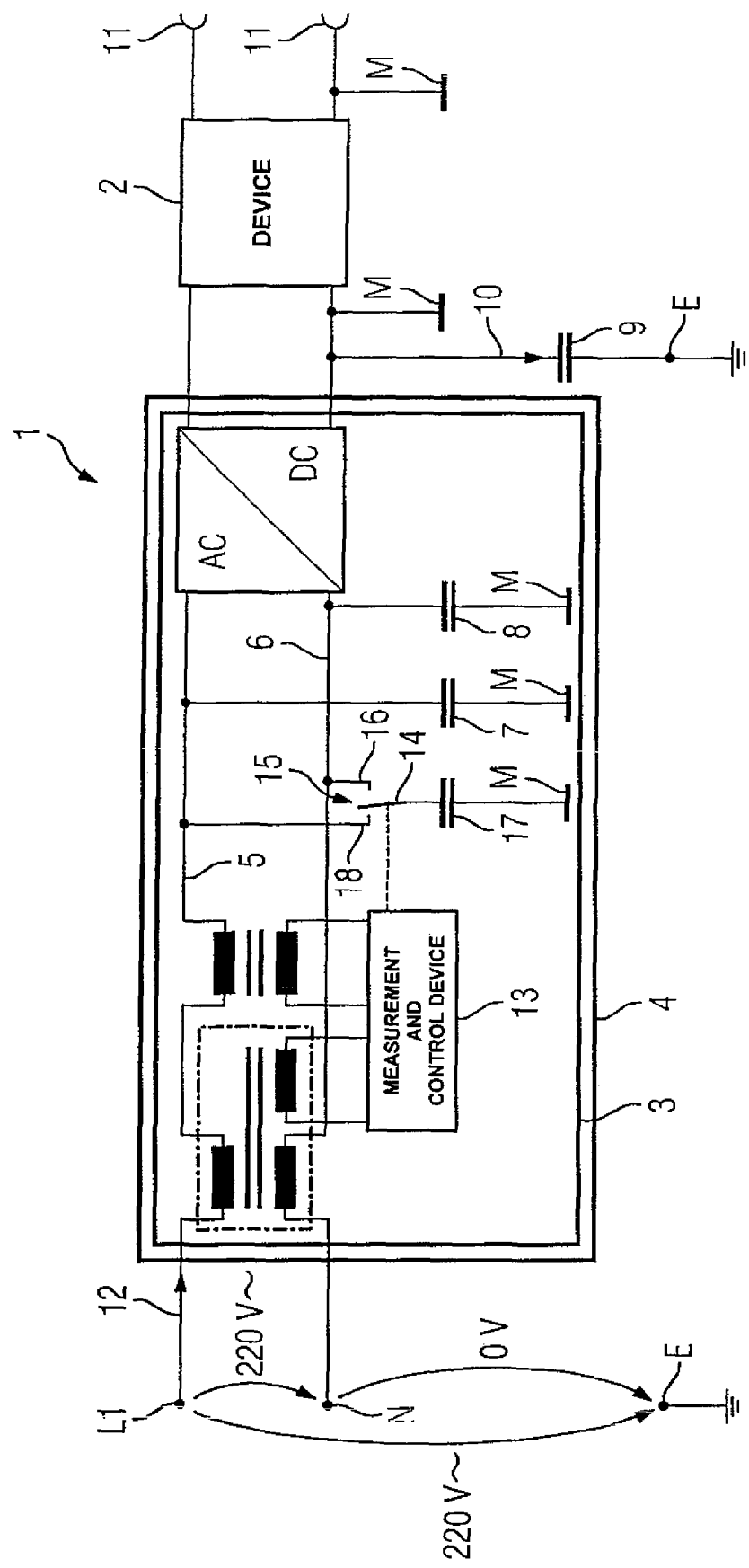

TOTALLY INSULATED SWITCHED MODE POWER SUPPLY

BACKGROUND OF THE INVENTION

1. Field of the Invention

The invention relates to a totally insulated switched mode power supply.

2. Description of the Related Art

A totally insulated switched mode power supply that can be connected to a grounded AC or three-phase power supply system is generally known, where the switched mode power supply is provided for supplying a DC or AC voltage to a device or a load. This conventional switched mode power supply has Y capacitors, which are provided for asymmetrical interference suppression of the switched mode power supply or are acquired to meet the requirements in respect of the ENC response of the switched mode power supply. The two conductors in the switched mode power supply, where one conductor is connectable to the phase conductor and the connector is connectable to the neutral conductor via suitable connections, are wired symmetrically to a Y capacitor for this purpose to also avoid a relatively high voltage to the ground potential in cases in which the switched mode power supply is connected with incorrect polarity to the AC or three-phase power supply system. This means that a Y capacitor is connected between the phase conductor and the electrically conductive housing and a further Y capacitor is connected between the neutral conductor and this housing, where these capacitors have substantially the same capacitance.

Owing to the fact that the ground potential of the AC or three-phase power supply system, with the neutral conductor thereof being connected to this ground potential, is usually different than the potential of the housing, referred to below as frame potential, there is a voltage drop across the Y capacitor connected between the neutral conductor and the housing. In the case of a 220 V system voltage, in the most unfavorable case, a voltage of up to 110 V can drop across this Y capacitor, where a low current can flow from the frame to ground potential. In other words, the ground voltage allows a low fault current or leakage current to flow away via the always present leakage capacitance of a totally insulating or grounded device connected to the switched mode power supply or a "grounded" person.

This low fault current or leakage current, which is usually less than 5 mA, can cause unpleasant haptic stimuli in people and can also have a disruptive influence on sensitive electronic components of a device connected to the switched mode power supply or the peripheral interface thereof.

SUMMARY OF THE INVENTION

It is therefore an object of the invention to provide a switched mode power supply that avoids the above-described disadvantages.

This and other objects and advantages are achieved in that the switched mode power supply is provided with devices, which are configured to detect the conductor, which is connected to the neutral conductor, by the phase angle of a fault current that represents a leakage current flowing from the housing part to the ground potential, and to connect a further Y capacitor between the housing part and the detected conductor.

In accordance with the invention, small fault currents are detected and which of the two conductors of the switched mode power supply is connected to the phase conductor and which is connected to the neutral conductor is derived from the phase angle of the fault currents. If the conductor that is connected to the neutral conductor is known, then the fault current can be reduced in a targeted manner by connecting an additional capacitor between this conductor and the housing to reduce the voltage potential at the leakage capacitance, which results in improved protection of the connected device and the person or operator.

In one embodiment of the invention, the switched mode power supply includes a controllable switch, which is provided for connecting the further Y capacitor to the first or second conductor. By means of such measures, both symmetrical and asymmetrical interconnection of the two conductors of the switched mode power supply can be implemented. In a first switch position, the further Y capacitor is connected to one of the two conductors. In a second switch position, this further Y capacitor is connected to the other conductor. In a third switch position, the symmetrical interconnection is retained, i.e., the further Y capacitor is not connected in this switch position, where only the two Y capacitors are each connected to one of the two conductors.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be explained in more detail below using an exemplary embodiment with reference to the single FIGURE in the drawing, in which:

The FIGURE shows, in simplified form, an arrangement with a switched mode power supply and a device in accordance with the invention.

DETAILED DESCRIPTION OF THE PREFERRED EMBODIMENTS

In the FIGURE, a totally insulated switched mode power supply is denoted by 1, where the switched mode power supply produces a DC voltage from an AC voltage of an AC or three-phase power supply system that is supplied to this switched mode power supply 1. This DC voltage is provided for supplying a device 2, which is connected to the switched mode power supply 1 and is likewise totally insulated. It should be noted that it is also possible for this device not to be totally insulated, in which case the housing of the device 2 is connected to a PE conductor of the AC or three-phase power supply system. The housing which is provided for accommodating the electrical and electronic components of the switched mode power supply 1 is provided with an electrically conductive housing part 3 and total insulation 4, which surrounds the electrically conductive housing part 3. In addition, the switched mode power supply 1 includes inductors and capacitors for asymmetrical interference suppression, known per se, where first and second conductors 5, 6 of the switched mode power supply 1 are connected to Y capacitors 7, 8. For this purpose, in the present exemplary embodiment, the Y capacitor 7 is connected between the first conductor 5 and the electrically conductive housing part 3, referred to below as frame potential M, and the second Y capacitor 8 is connected between the second conductor 6 and the frame potential M. In addition, the device 2 is connected to this frame potential M via one of the two DC output lines of the switched mode power supply 1, whose other DC output line, for example, a 24-V output line, is likewise connected to the device 2.

In the present exemplary embodiment, it is assumed that the first conductor 5 is connected to a phase conductor L1 and the second conductor 6 is connected to a neutral conductor N of the AC or three-phase power supply system. It should be noted that it is also possible for the first conductor 5 to be connected to the neutral conductor N and for the second conductor 6 to be connected to the phase conductor L1. This is the case when a user inserts a mains plug (not shown) of the switched mode power supply 1 into a socket outlet of the AC or three-phase power supply system with the incorrect polarity. The neutral conductor N of the AC or three-phase power supply system is usually connected to a ground potential E, as a result of which a voltage of 0 V is present between the neutral conductor N and the ground potential, where 220 V is usually present between the phase conductor L1 and the neutral conductor N or the ground potential E of the AC or three-phase power supply system.

The ground voltage that results from the potential difference between the ground potential and the frame potential E, M usually allows a low fault current or leakage current to flow away via a continually present leakage capacitance of a totally insulated device, which is connected to a switched mode power supply, a peripheral interface of this device or a "grounded person". In the present exemplary embodiment, a discharge capacitor 9 represents such a leakage capacitance, where a leakage current 10 flows away from frame potential M to ground potential E via the discharge capacitor 9. It should be noted that it is also possible for such a discharge current to flow away from the frame potential M of a peripheral interface 11 of the device 2 as a result of a leakage capacitance.

In order to reduce this discharge current, a fault current 12 that is proportional to this discharge current 10 is initially detected, and the phase angle of this fault current 12 is then used to derive or detect which of the two conductors 5, 6 is connected to the neutral conductor N. For this purpose, a measurement and control device 13 is provided which, in the contemplated exemplary embodiment, identifies that the second conductor 6 is connected to the neutral conductor N based on the phase angle of the fault current 12. After this detection of the conductor connected to the neutral conductor N, i.e., the second conductor 6, the measurement and control device 13 reduces the discharge current 10 or the fault current 12 by virtue of the measurement and control device 13 for this purpose reducing the voltage drop across the leakage capacitance, i.e., across the discharge capacitor 9, by virtue of the measurement and control device 13 controlling a controllable switch 14 such that the controllable switch 14 changes from a rest position 15 into a switch position 16. As a result, a further Y capacitor 17, which is connected to the frame potential M, is connected to the second conductor 6. Consequently, once the conductor connected to the neutral conductor N has been detected, the system is changed or switched over from a symmetrical connection of the two conductors to an asymmetrical connection. Owing to the fact that a further capacitor 17 is connected between the second conductor 6 and the housing part 3 (frame potential), the voltage potential across the discharge capacitor 9 is reduced, which means improved protection of the connected device 2, the peripheral interface 11 thereof or the person or operator.

For the case in which a user inserts a mains plug (not shown) of the switched mode power supply 1 into a socket outlet of the AC or three-phase power supply system with incorrect polarity, the first conductor 5 is connected to the neutral conductor N. In this case, the measurement and control device 13, after detection of the conductor 5 connected to the neutral conductor N, controls the switch 14 such that the switch 14 in a position 18 connects the further capacitor 17 to the first conductor 5.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A totally insulated switched mode power supply for producing a supply voltage for an electrical device, comprising:
    an electrically conductive housing part;
    a first electrical conductor and a second electrical conductor, an electrical conductor of the first and second electrical conductors being for connection to a phase conductor and another of the first and second electrical conductors being for connection to a neutral conductor of a grounded AC or three-phase power supply system;
    a first Y capacitor and a second Y capacitor, the first and second Y capacitor providing asymmetrical interference suppression of the switched mode power supply, and one capacitor of the first and second Y capacitors being connected between the first electrical conductor and the housing part and another of the first and second Y capacitors being connected between the second conductor and the electrically conductive housing part;
    a further Y capacitor; and
    a device configured to detect which of the first and second electrical conductors is connected to the neutral conductor based on a phase angle of a fault current indicating a leakage current flowing from the electrically conductive housing part to a ground potential, and configured to connect the further Y capacitor between the electrically conductive housing part and a detected conductor of the first and second electrical conductors.

2. The totally insulated switched mode power supply as claimed in claim 1, further comprising:
    a controllable switch for connecting the further Y capacitor to the first electrical conductor or the second electrical conductor.

3. The totally insulated switched mode power supply as claimed in claim wherein the device comprises a measurement and control device.

* * * * *